July 15, 1969 W. NIEMEYER 3,455,768
APPARATUS FOR WELDING FLAT BLANKS OF PLASTIC OR PLASTIC-COATED
MATERIAL ONTO PLASTIC ARTICLES
Filed April 20, 1964 2 Sheets-Sheet 1
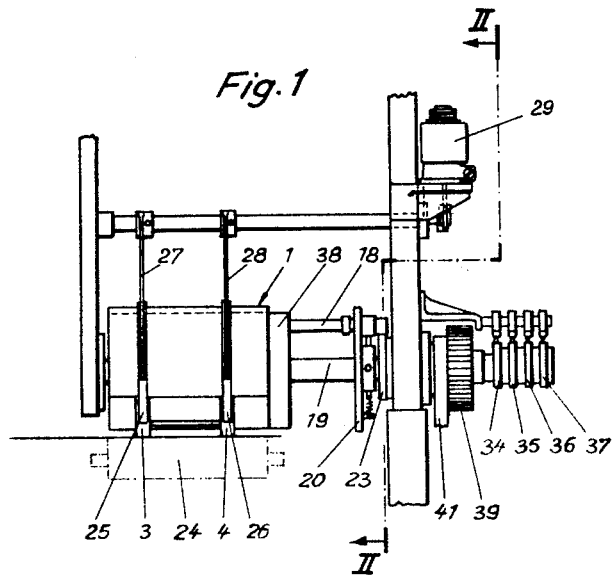
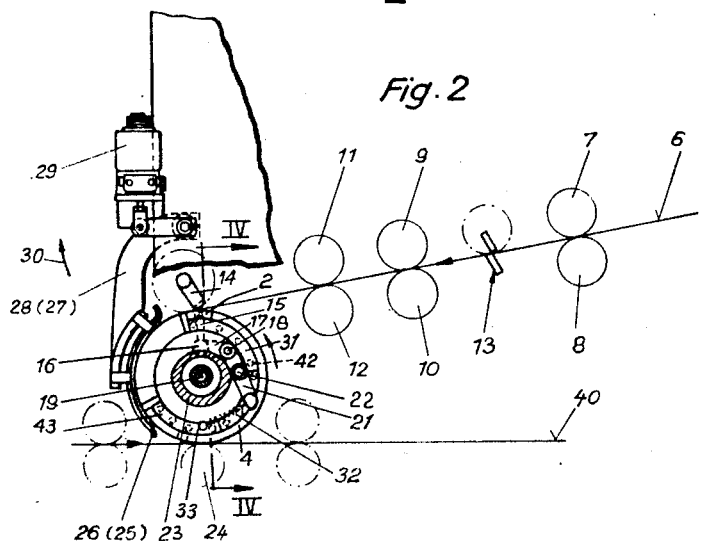
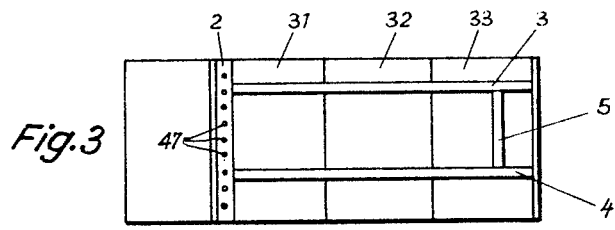
INVENTOR.
Willy Niemeyer,
BY
Hofgren, Wegner, Allen,
Stellman & McCord Attys.

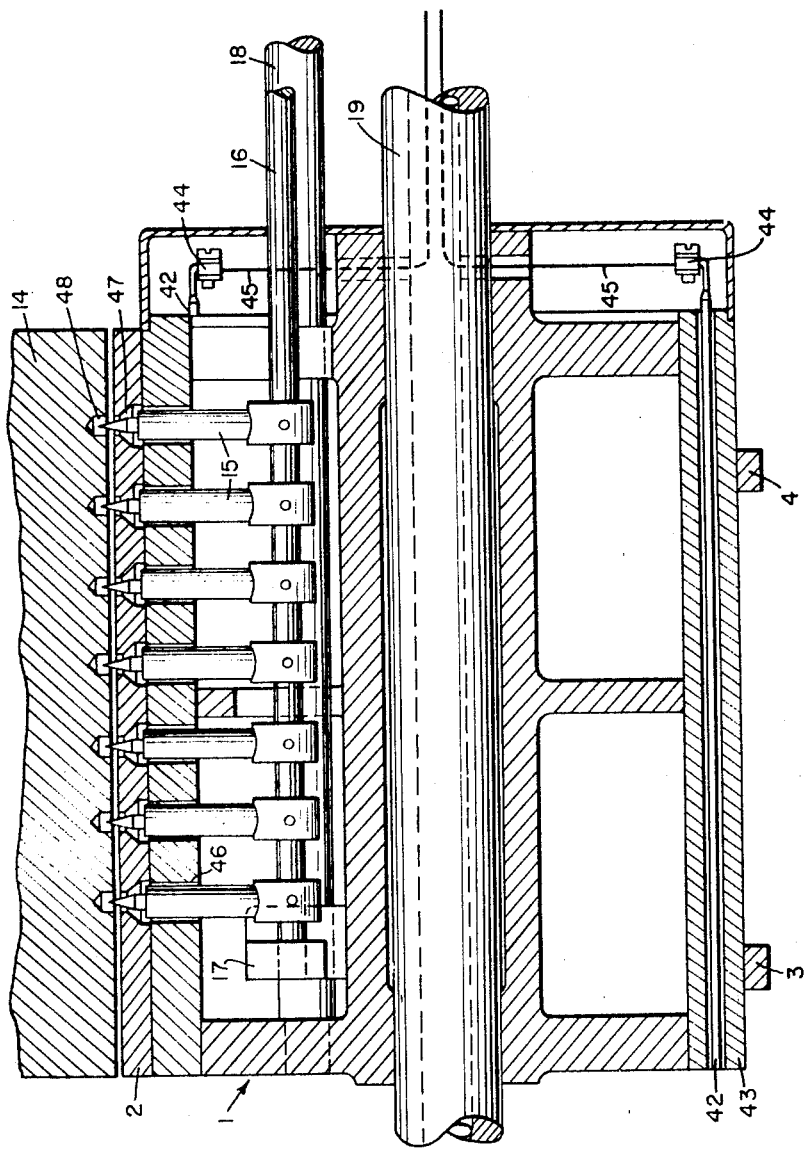

United States Patent Office 3,455,768
Patented July 15, 1969

3,455,768
APPARATUS FOR WELDING FLAT BLANKS OF PLASTIC OR PLASTIC-COATED MATERIAL ONTO PLASTIC ARTICLES
Willy Niemeyer, Westphalia, Germany, assignor to Windmöller & Hölscher, Westphalia, Germany
Filed Apr. 20, 1964, Ser. No. 360,907
Int. Cl. B29c 27/02; B32b 31/20
U.S. Cl. 156—521                    8 Claims

ABSTRACT OF THE DISCLOSURE

Apparatus for welding flat rectangular blanks having at least one thermoplastic surface to the open bottom of a bag having an exposed thermoplastic surface including conveying the blank to a rotatable heating cylinder, heating the blank in stripe-like areas along its sides by heating elements disposed on the surface of the cylinder, disengaging the blank from the cylinder, and pressing the blank into engagement with the exposed surface of a bag to join the blank to the bag by welded seams. Additional heating elements are mounted adjacent to the heating cylinder for movement into and out of heating relationship with the blanks carried by the cylinder.

---

The invention relates to a method and apparatus for welding flat blanks of plastic or plastic-coated material on to plastic articles and is more especially concerned with the heating of the weld points and the positioning of the blanks.

It is well known to join superimposed layers, e.g. folds, blanks or webs, or thermoplastic material by welding the layers between heated press jaws. This method cannot however be used if further layers of thermoplastic material, which are not to be welded to the overlying layers, are situated beneath the layers to be joined, as is the case for example when producing sacks or bags; because the jaws weld together all the thermoplastic webs lying between them. In order to weld the edges of articles, it has therefore already been proposed to set the edges to be welded at right angles to the plane of the web for effecting the welding process, to bring the welding jaws into action in this plane. This method offers many advantages, but requires additional tools to process the article. In other prior proposals, welding of the articles has been eliminated and adhesives used which are applied at the points to be joined. However, only contact adhesions can be used for thermoplastic webs, which adhesives permit the webs to be pulled apart and therefore do not make it possible to obtain a firm enough joint such as is required for forming sacks or bags.

The invention has for its basis the fact that unwanted welding of the parts of an article lying beneath the layers to be joined can be avoided if the heat necessary for welding is only applied to the article on the side of the welded seam and is limited so that it does not heat up the underlying parts of the article to welding temperature.

On the basis of this principle, the invention provides that, in the welding of flat blanks of plastic or plastic-coated material on to plastic articles, the blanks, whilst being conveyed to the welding station, should be heated up in the areas to be welded, and upon being conveyed further, should be applied to, and pressed into engagement with the article as it passes to the welding station.

This method produces absolutely perfect welded joints and can be carried out in the plane of the webs. In addition, it offers considerable advantages compared with glueing with contact adhesives or welding in a plane at right angles to the web. In particular, it can be used for producing bags or sacks of thermoplastic material. It can also be used for other purposes and can be used economically even when it is not necessary to avoid welding the webs under the welding points.

As a further feature of the invention, it is proposed that the blanks be heated on both sides thereof at all or some of the areas to be welded. A still further feature of the invention proposes that the heating of the welding areas of the upper side of the blank should be continued during the application and pressing on of the blank. This heating is of course so controlled that the welding temperature is not reached in the underlying webs which are not to be welded.

Further features of the invention will become apparent from the following description in conjunction with the accompanying drawings showing an apparatus according to the invention for the welding-in of blanks of plastic or plastic-coated material used as inserts in the open bottoms of cross-bottom valve bags made of plastic.

In the drawings:
FIGURE 1 is an elevational view of the apparatus seen in the direction of flow of the cross-bottom valve bags;
FIGURE 2 is a section taken along the line II—II of FIGURE 1;
FIGURE 3 is a detail developed view showing the construction of the jacket of a working cylinder for use in the apparatus of FIGURES 1 and 2; and
FIGURE 4 is an enlarged cross-sectional view taken on the line IV—IV of FIGURE 2.

The apparatus according to the invention consists essentially of a working cylinder 1 adapted to be rotated at the speed of the articles conveyed thereto, and which carries on its periphery heating elements 2, 3, 4, 5 corresponding to the areas of the inserts to be welded (see FIGURE 3). The heating elements 2 to 5 are adapted to be heated by heating resistances 42 to be described hereafter which are provided in the cylindrical jacket 43 of the working cylinder 1 which is in the form of a hollow cylinder. The inserts of plastic or plastic-coated material are separated from a web 6, which is fed from a supply reel (not shown) through pairs of feed rollers 7–8, 9–10 and 11–12. Between the pairs of feed rollers 7–8 and 9–10 there is provided a transverse separating station 13, at which the cross-wise cutting of the web takes place at intervals corresponding to the lengths of the inserts, the cuts not going completely through the web so as to leave thin connecting bridges. The moment at which the web 6 is partially separated in a transverse direction is selected so that the free end of the web is fed to the cylinder when the heating element 2 thereof is in the position shown in FIGURE 2. During one revolution of the cylinder 1, the peripheral speed of which is greater than the feed velocity of the web 6, the web 6 is carried on further for a distance corresponding to the length of an insert.

A rotating member 14 provided above the cylinder 1 and supported parallel to the axis of the latter acts in conjunction with the front heating element 2 as a clamp device to grasp the leading end of the web 6. Because of the greater peripheral speed of the cylinder and the rotating body compared with the speed of the web 6, the trailing end of the latter at the next partial separation line is completely torn away from the remainder of the web held back by the feed rollers. This torn-off blank which is provided as an insert is carried along by the cylinder 1, even after the rotating member 14 has been lifted off the cylinder 1, in the manner described below, and thereby comes to rest entirely on the heating elements of the cylinder.

To ensure perfect conveyance and positioning of the inserts on the cylinder 1, the latter is provided with a row of needles 15, which at the moment of transfer of an insert to the cylinder 1 project from the front heating element 2 in a radial direction through openings 46 in jacket 43 and openings 47 in the heating element. By means of the rotating member 14 which is provided with peripheral grooves, holes or slits 48 which cooperate with the extendable needles 15, and the rolling of said rotating body on the heating element, the insert is impaled at its leading edge on the needles 15. The needles 15 are arranged on a needle bar 16 inside the cylinder 1 and are movable in a radial direction, the needle bar 16 being firmly connected to a control shaft 18 through a lever 17. The control shaft 18 is supported at one end in a side wall of the cylinder 1 and at the other end in a disc 20 attached to the cylinder shaft 19. The said other end of the shaft 18 projects beyond the disc 20 and is connected to a lever which carries a roller 22, which is spring-loaded into engagement with a cam 23 attached to the side frame of the machine. When the cylinder 1 rotates, the needles 15 are operated by the cam 23, during feeding of an insert, to the position in which they project from the heating element 2.

After the discharge position of the cylinder 1 has been reached, the needles 15 are withdrawn into the openings 47 out of contact with the insert and the insert is inserted by the use of pressure into an open bottom of a crossbottom valve sack made of plastic. In order to support this pressure, a support roller 24 is arranged on the side opposite the plane of feed 40 of the cross-bottom valve bags.

During the conveyance of the inserts from the pick-up point to the discharge point which is almost diametrically opposed to it, the inserts are heated in the areas which are to be welded. Especially when using plastic-coated material, in order to apply to the plastic-coating reliably and in a suitable manner, the heat necessary for welding, two further heating elements 25 and 26 are provided which extend in the peripheral direction of the cylinder 1 between the pick-up and discharge points for the inserts, and are positioned opposite the heating elements 3 and 4. The further heating elements 25 and 26 are each secured to a pivotably supported carrier 27, 28, which under the action of a solenoid actuator 29 can be pivoted in the direction of the arrow 30, from its working position shown in FIGURE 2, to a rest position. This movement is effected automatically when the machine drive is switched off, in order to prevent burning of the insert which has come to a standstill, since the temperature of the heating elements 25, 26 which are spaced from the periphery of the roller, is made considerably higher than that of the heating elements 2 to 5. A switch can also be provided which switches off the heating elements 25 and 26 when pivoting takes place.

The heating element 2 which is positioned at the front end of the cylinder when seen in the direction of rotation of the cylinder 1, and which has bores 47 for the needles 15, 15 of a length which corresponds to the axial length of the cylinder 1. The heating elements 3, 4, 5, 25, 26 can be adjusted at right angles to their length in order to suit different insert sizes. The heating element 5 can also be exchanged for another heating element of suitable size in order to retain a closed frame form for the weld seam when the distance between the heating elements 3 and 4 is varied.

To allow adjustable fixing of the heating elements 3 and 4, a longitudinal groove of dove-tail cross-section, extending in the direction of the axis of the cylinder, is provided in each of the jacket surface portions 31 and 33, said grooves having suitably shaped nuts positioned therein into which can be screwed counter-sunk screws inserted through holes in the heating elements 3, 4. By means of this construction, the weld format can be infinitely varied in the direction of the axis of the cylinder.

The adjustment of the position of the heating elements 3, 4 can also be made by providing a row of threaded holes in the jacket surface portions 31 and 33 in the direction of the axis of the cylinder, into which the screws inserted through the heating elements can be screwed.

This method of adjustment is preferably also provided for the heating element 5, which must be exchanged for another more suitable heating element when the distance between the heating elements 3 and 4 is varied.

The heating elements 2–5 may be heated directly by electrical resistances. According to a feature of the invention however these heating elements 2–5 are not heated directly but by means of heating members 42 arranged in the underlying jacket 43 of the cylinder 1, and from which the heat passes to the heating elements 2–5 by contact. The heating members or resistances 42 are connected by terminal plugs 44 to connecting cables 45 which are led through the hollow shaft 19 to slip rings 34–37. This has the advantage first of all that the space for the heating members 42 is not limited to that available for the heating elements. For, if only narrow bands of the insert are to be heated, the heating elements 2–5 are too narrow to be able to accommodate effective direct heating means. The fitting of the heating members 42 into the jacket 43 of the cylinder 1 also saves alterations in the connecting cables if the position of the heating elements is altered.

A special advantage of the heating of the cylinder jacket consists however in the fact that the areas of the plastic adjacent to the bands heated by the heating elements are also warmed somewhat by radiation. For the plastic stretches when heated and would become wrinkled if considerable temperature differences occurred between adjacent surfaces. In addition, it is then not necessary to heat the bands to be welded to such a high temperature as would be necessary if only the bands themselves were heated, since the conduction of heat from the bands into the adjacent zones is reduced.

As a further development of the invention, the heated jacket area of the cylinder 1 is sub-divided into three sections 31, 32, 33 which can be heated independently of each other, so that the heat being applied can be suited to the length of the inserts. At the free end of the hollow shaft 19 four sliprings 34 to 37 are arranged, from which electric leads 45 are led through the hollow shaft to the heatable jacket sections 31 to 33 respectively of the cylinder. The connecting terminals 44 for the heating resistances 42 in the jacket sections are covered by a protective cowling 38 (FIGURE 1).

The cylinder 1 receives its drive from the drive of the machine by means of a gearwheel 39. For the purpose of correct adjustment of the cylinder 1 with respect to the cross-bottom valve bags conveyed in the plane 40, the gearwheel 39 can be pivoted backwards or forwards a certain distance by operating a lever 41 carrying an intermediate gear (not shown).

Instead of the described needle arrangement for holding the inserts on the cylinder 1, a clamping jaw controlled by a cam and working in conjunction with the front surface of the heating element 2 may be provided, which clamps the front end of an insert laid round the edge of the heating element by a folding blade instead of the rotating body 14.

For the simultaneous insertion and welding-in of inserts in both open bottoms of a cross-bottom valve bag, two of the described devices are arranged adjacent to each other in the machine. The device which is to weld an insert into the open cross-bottom which has the valve insert at its rear corner flap (in the direction of feed), does not have the heating element 5.

The foregoing detailed description has been given for clearness of understanding only and no unnecessary limitations should be understood therefrom as some modifications will be obvious to those skilled in the art.

I claim:

1. An apparatus for the seam welding of flat, rectangular blanks having at least one thermoplastic surface into the open bottom of a bag having at least an exposed thermoplastic surface, comprising: a rotatable heating cylinder; means on said cylinder for engaging each blank and for holding an engaged blank for rotation with the cylinder; means for releasing said blank engaging and holding means to discharge each blank at the point of contact with a bag; and means for heating each blank on its face engaged by said cylinder during rotation thereof, said heating means comprising at least three stripe-like heating elements disposed on the surface of said cylinder, a first one of said heating elements extending parallel to the axis of said cylinder and two of said heating elements extending along the outer circumference of said cylinder in a spaced relationship and meeting said first heating element at right angles.

2. An apparatus as in claim 1, wherein said engaging and holding means comprises a shaft and row of needles fixed to said shaft, said releasing means including a cam drive for controlling said shaft so as to move said needles in a radial direction, and wherein said first heating element is provided with a row of holes containing the top ends of said needles in their inoperative blank releasing position and from which said needles are adapted to project outwardly in their operative blank engaging and holding position through the action of said cam drive, said apparatus further comprising a clamping pad rotatably mounted outside of said cylinder and comprising a row of holes adapted to match said needles in their operative position, so as to impale each blank onto said needles.

3. An apparatus as in claim 1, further comprising a plurality of heating elements mounted outside of said cylinder and extending adjacent to part of the outer circumference thereof opposite said circumferential heating elements, so as to heat each blank at least partially also on its face unengaged by said cylinder during its rotation therewith.

4. An apparatus as in claim 3 wherein said heating elements mounted outside of said cylinder are mounted for pivotal movement from an operative to an inoperative position.

5. An apparatus as in claim 1 wherein said engaging and holding means comprises a shaft and a row of needles fixed to said shaft, said releasing means including a cam drive for controlling said shaft, so as to move said needles in a radial direction, and wherein said first heating element is provided with a row of holes containing the top ends of said needles in their inoperative blank releasing position and from which said needles are adapted to project outwardly in their operative blank engaging and holding position through the action of said cam drive, said apparatus further comprising a clamping pad rotatably mounted outside of said cylinder and comprising a row of holes adapted to match said needles in their operative position, so as to impale each blank on to said needles, and a plurality of heating elements mounted outside of said cylinder and extending adjacent to part of the outer circumference thereof opposite said circumferential heating elements, so as to heat each blank at least partially also on its face unengaged by said cylinder during its rotation therewith.

6. An apparatus as in claim 1 wherein said cylinder is a hollow cylinder and wherein said heating elements are heated by electrical resistances arranged in the cylinder wall, said cylinder wall being divided into a plurality of sections, the heating of each section being separately controllable.

7. Apparatus as in claim 1 further comprising a second heating element extending parallel to the axis of said cylinder opposite said first axial heating element and located between said two circumferential heating elements joining them at right angles.

8. Apparatus as in claim 7 wherein said first axial heating element is as long as the axial length of said cylinder, said two circumferential heating elements are adjustable in the axial direction of said cylinder, and said second axial heating element is exchangeable to meet different distances between said two circumferential heating elements.

References Cited

UNITED STATES PATENTS

| | | | |
|---|---|---|---|
| 1,949,879 | 3/1934 | Potdevin | 93—8 |
| 2,668,481 | 2/1954 | Robinson | 93—8 |
| 2,955,517 | 10/1960 | Honsel | 93—8 |
| 3,103,856 | 9/1963 | Rawe et al. | 93—8 |
| 2,189,673 | 2/1940 | McNamee | 156—433 |
| 2,613,007 | 10/1952 | VonHofe | 156—499 |
| 2,619,247 | 11/1952 | Gaubert | 156—583 |
| 2,720,165 | 10/1955 | Gullixson et al. | 271—82 |
| 2,776,510 | 1/1957 | Klopfenstein | 156—583 |
| 3,020,383 | 2/1962 | Onishi et al. | 100—93 |
| 3,111,081 | 11/1963 | Westbrook | 100—93 |
| 3,112,238 | 11/1963 | Caldwell et al. | 156—499 |
| 3,188,084 | 6/1965 | Raybuck | 271—82 |

EARL M. BERGERT, Primary Examiner

W. E. HOAG, Assistant Examiner

U.S. Cl. X.R.

93—8; 156—556, 568, 582, 583